United States Patent [19]

Nagano

[11] Patent Number: 5,203,213
[45] Date of Patent: Apr. 20, 1993

[54] BICYCLE SPEED CONTROL APPARATUS

[75] Inventor: Masashi Nagano, Izumi, Japan

[73] Assignee: Shimano, Inc., Osaka, Japan

[21] Appl. No.: 789,876

[22] Filed: Nov. 12, 1991

[30] Foreign Application Priority Data

Nov. 14, 1990 [JP] Japan .................... 2-309557

[51] Int. Cl.⁵ .................... B62M 25/04; B62K 11/14; B62K 23/06
[52] U.S. Cl. .................... 74/475; 74/142; 74/489; 74/502.2; 192/4 R
[58] Field of Search .............. 74/142, 475, 489, 502.2; 192/4 R

[56] References Cited

U.S. PATENT DOCUMENTS

| | | | |
|---|---|---|---|
| 4,319,673 | 3/1982 | Kojima | 192/4 R |
| 4,995,280 | 2/1991 | Tagawa | 74/502.2 X |
| 5,012,692 | 5/1991 | Nagano | 74/489 X |
| 5,044,213 | 9/1991 | Nagano | 74/475 X |
| 5,095,768 | 4/1990 | Nagano | 74/489 X |

FOREIGN PATENT DOCUMENTS 2012893 8/1979 European Pat. Off. .
67692 12/1982 European Pat. Off. .
371429 6/1990 European Pat. Off. .

Primary Examiner—Allan D. Herrmann
Attorney, Agent, or Firm—Dickstein, Shapiro & Morin

[57] ABSTRACT

A speed control apparatus for a bicycle includes a support shaft fixed to a bracket mounted on a handlebar; a first control lever pivotable about the support shaft and retainable in position after pulling a change speed wire to effect a change speed operation, the first control lever being returned to a pull starting position after the change speed operation; and a second control lever pivotable about the support shaft for releasing the change speed wire to effect a change speed operation, the second control lever being returned to a release starting position after the change speed operation. For improved operability of the apparatus, the first and second control levers are operable in opposite directions, with respective control portions of the levers movable close to each other when the levers are operated.

10 Claims, 5 Drawing Sheets

BICYCLE SPEED CONTROL APPARATUS

BACKGROUND OF THE INVENTION

1. Field of the Invention

The present invention relates to a speed control apparatus having a supporting device; a first control member pivotable about the supporting device and retainable in position after pulling a change speed wire to effect a change speed operation, the first control member being returned to a pull starting position after the change speed operation; a second control member pivotable about the supporting device for releasing the change speed wire to effect a change speed operation, the second control member being returned to a release starting position after the change speed operation; a first control portion formed on the first control member; and a second control portion formed on the second control member.

2. Description of the Related Art

A bicycle speed control apparatus as noted above is disclosed in U.S. Pat. No. 5,012,692, for example. This prior control apparatus includes a shift lever acting as the first control member, and a release lever acting as the second control member, which are operable in the same direction to wind and unwind a change speed wire. The shift lever is operated to wind the wire, and the release lever to unwind the wire.

In the above construction, the shift lever returns to home position after each shifting operation. This feature provides the advantage of allowing the shift lever to be operated within an optimal stroke range to facilitate control even when the shift lever is operated to provide a speed many stages away from the home position. That is, the shift lever is shifted back and forth plural times to effect change speed in the wire winding direction. When effecting change speed in the wire unwinding direction, the release lever is operated to cancel action of a position retaining device.

However, since the two levers are operable in the same direction according to the above prior construction, the cyclist could easily operate the wrong lever in a change speed operation. As a result, there is not a little chance of effecting change speed in the wrong direction. Furthermore, this type of speed control apparatus may be disposed adjacent a grip of a handlebar. In such a case, the two levers usually are operated with a thumb. Generally, there is only one position that is optimal for lever operation and, where the two levers are provided, one of the levers tends to be very difficult to operate.

SUMMARY OF THE INVENTION

The object of the present invention is to provide a bicycle speed control apparatus which facilitates operation of the first control member without an error with respect to a change speed direction.

The above object is fulfilled, according to the present invention, by a bicycle speed control apparatus in which the first control member and the second control member are operable in opposite directions, the first control portion and the second control portion being movable close to each other circumferentially of the supporting device.

According to this control apparatus, the first and second control members are operable in opposite directions, with the respective control portions thereof movable close to each other circumferentially of the supporting device. For example, the two control members may be operated separately with a thumb and a first finger. This reduces the possibility of operating the wrong lever, to assure a reliable change speed operation.

By determining home positions of the two levers in a way to facilitate operation, for example, this construction allows the cyclist to operate the levers in the opposite directions without confusion between the first and second control portions of the levers. This characterizing feature of the present invention, thus, assures a reliable change speed operation, and greatly improves operability of the bicycle speed control apparatus.

Other features and advantages of the present invention will be apparent from the description of the preferred embodiment to be had with reference to the drawings.

DETAILED DESCRIPTION OF THE PREFERRED EMBODIMENT

Figure 1:
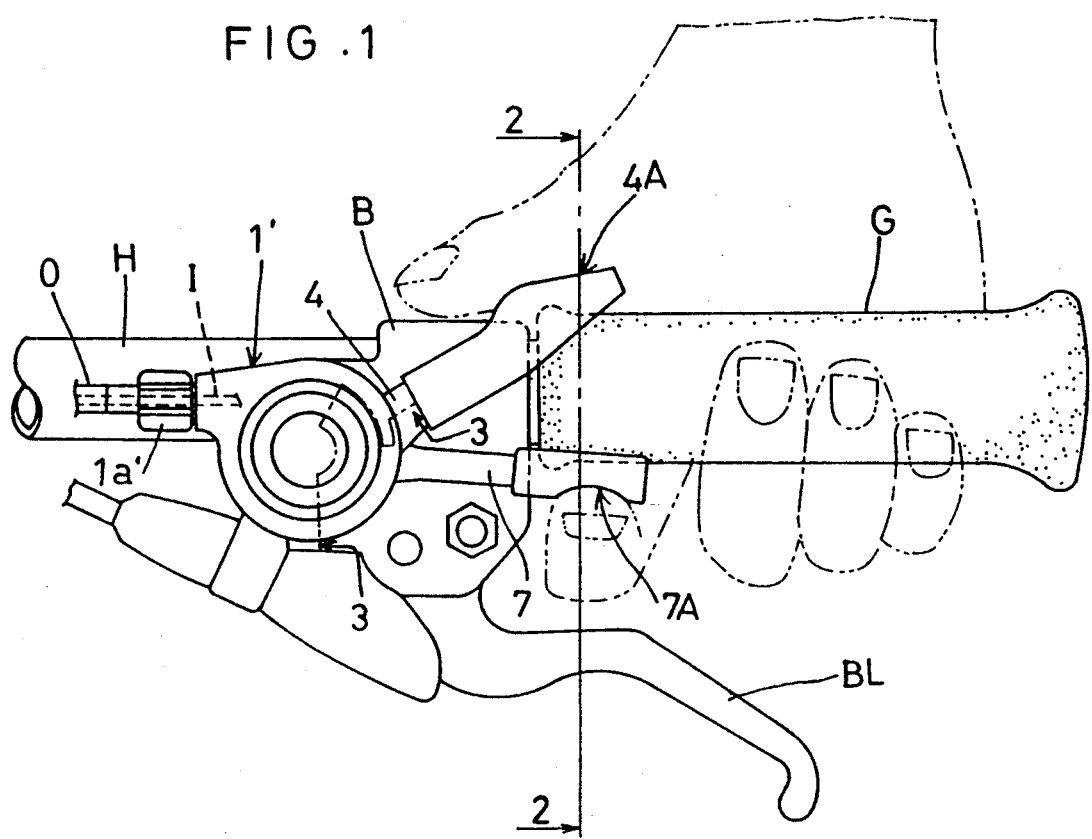
FIG. 1 is a bottom view of a bicycle speed control apparatus according to the present invention attached adjacent a grip.
Figure 2:
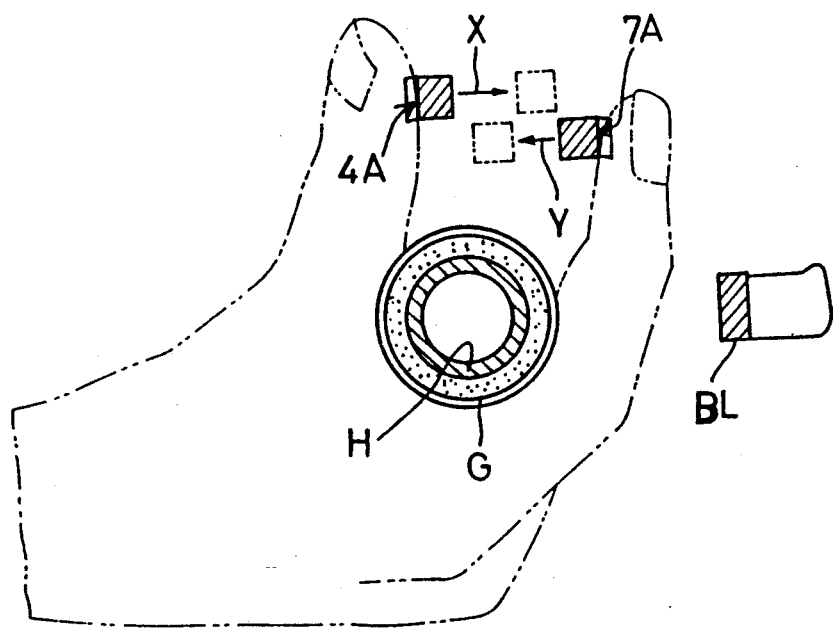
FIG. 2 is an explanatory view showing a relationship between control levers and the grip.

As shown in FIGS. 1 and 2, a bicycle speed control apparatus embodying the present invention is secured to a bracket B of a brake lever BL disposed below a handlebar H and adjacent a grip G of a mountain bike. FIG. 1 is a bottom view showing a region adjacent the grip G, and FIG. 2 is a view seen from a proximal end of the grip G. In FIGS. 1 and 2, a cyclist's hand is shown in phantom lines.

This apparatus includes a shift lever 4 acting as a first control member, and a release lever 7 acting as a second control member. These levers 4 and 7 are pivotally connected to a support shaft (which will be described later) under the handlebar H to be operable in opposite directions. The two levers 4 and 7 have home positions and strokes determined such that a first control portion 4A of the shift lever 4 and a second control portion 7A of the release lever 7 are close to each other when the levers 4 and 7 are at respective shift ends (FIG. 2). In the illustrated example, the shift lever 4 is operable by the thumb of the hand holding the grip G, while the release lever 7 is operable by the first finger of the same hand. This arrangement allows a brake lever BL and the levers 4 and 7 of the speed control apparatus to be operated reliably and efficiently with the hand holding the grip G. In FIG. 1, reference I denotes a change speed wire extending from a gear change device such as a front derailleur not shown. Reference O denotes an outer sleeve surrounding the change speed wire. Reference 1' denotes a stationary case, and reference 1a' a bearing for the outer sleeve.

Details of the speed control apparatus will be described next.

Figure 3:
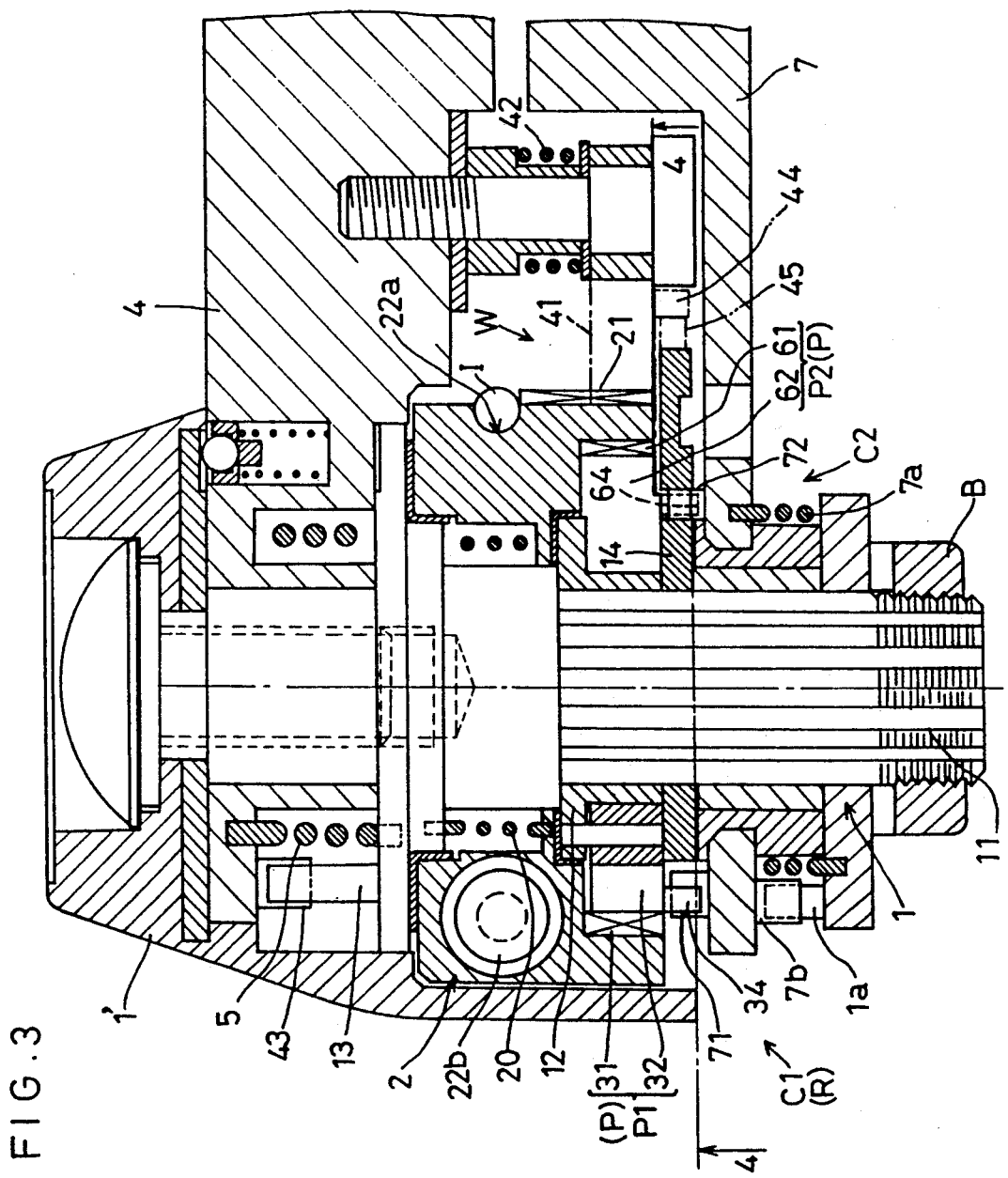
FIG. 3 is a view in vertical section of the speed control apparatus.
Figure 4:
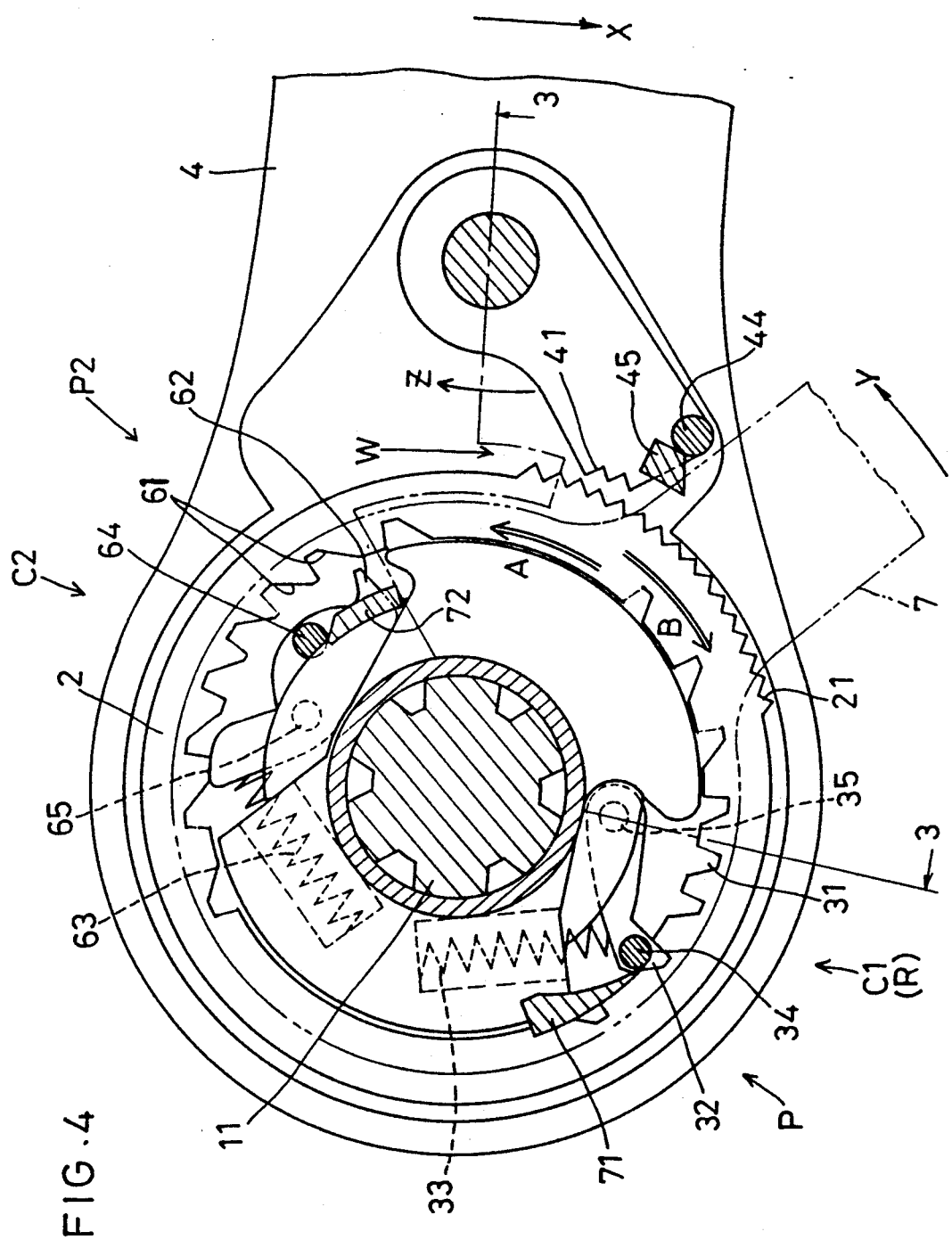
FIGS. 4 and 5 are views in cross section showing operating states of the speed control apparatus.
Figure 5:
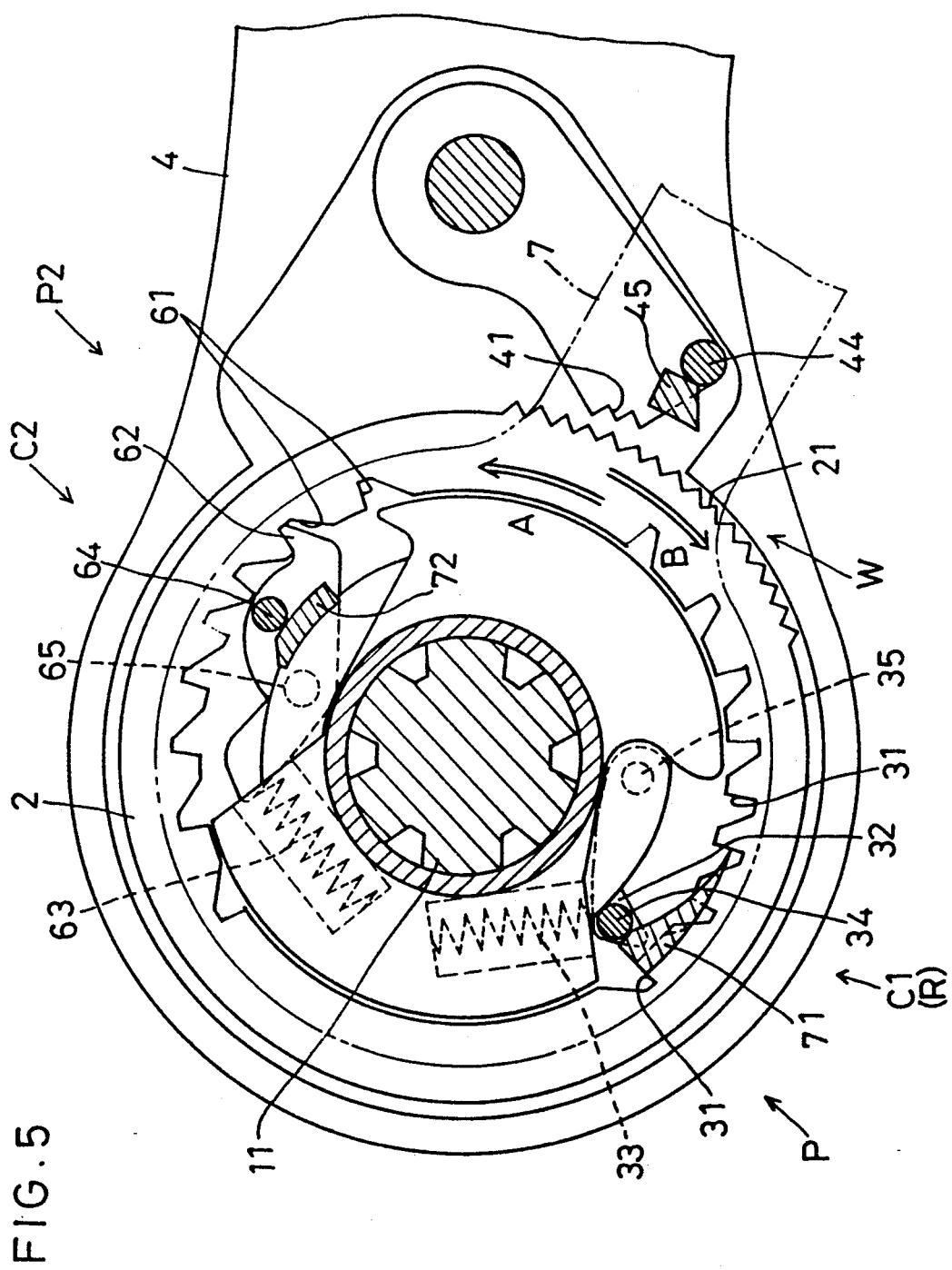

FIG. 3 is a view in vertical section through a support shaft 11 of this apparatus, which is shown upside down. The speed control apparatus is secured to the bracket B through a screw portion shown in the bottom of FIG. 3. FIGS. 4 and 5 are a section taken on line 4—4 of FIG. 3, showing the apparatus in a wire winding state and a wire unwinding state, respectively.

This speed control apparatus includes, as main components thereof, a stationary section 1 secured to the bracket B (including the support shaft 11, a retainer sleeve 12 and a fixed plate 14), a takeup reel 2 rotatable around the support shaft 11, a position retaining device P provided between the retainer sleeve 12 and takeup reel 2, a retention canceling device R for canceling action of the position retaining device P, the shift lever 4 and the release lever 7.

The constructions of the support shaft 11 and takeup reel 2 will be described first.

As shown in FIG. 3, the support shaft 11 extending downwardly from and perpendicular to the handlebar H, and the takeup reel 2 is rotatably supported on the support shaft 11 for winding up the change speed wire I.

The takeup reel 2 includes a wire winding section 22a and a wire engaging section 22b formed peripherally thereof. The takeup reel 2 is urged in a wire unwinding direction (indicated by an arrow A in FIGS. 4 and 5) by a return spring 20.

As shown in FIGS. 3 through 5, the takeup reel 2 further includes a plurality of feed teeth 21 defined on an outer peripheral surface thereof, and a plurality of first position retaining teeth 31 and a plurality of second position retaining teeth 61 defined on inner peripheral surfaces thereof.

The support shaft 11 carries the retainer sleeve 12 mounted not to be rotatable relative thereto. The retainer sleeve 12 includes a first position retaining pawl 32 and a second position retaining pawl 62 supported, to be pivotable relative to the retainer sleeve 12, on pawl shafts 35 and 65 extending substantially parallel to the support shaft 11. The first position retaining pawl 32 is urged by a first spring 33 toward the first position retaining teeth 31. The second position retaining pawl 62 is urged by a second spring 63 away from the second position retaining teeth 61.

The first position retaining teeth 31 and first position retaining pawl 32 constitute a first rotation stopper P1 having a one-way transmission function to limit rotation in the wire unwinding direction and allow rotation in the wire winding direction of the takeup reel 2 relative to the stationary section 1. The second position retaining teeth 61 and second position retaining pawl 62 constitute a second rotation stopper P2 to limit rotation in the wire winding direction of the takeup reel 2 relative to the stationary section 1. The first rotation stopper P1 and second rotation stopper P2 are referred to herein as the position retaining device P.

The relations of the shift lever 4 and release lever 7 with the support shaft 11 and retainer sleeve 12 will be described next.

The shift lever 4 is pivotably supported adjacent one end (an upper region in FIG. 3) of the support shaft 11, and urged in the wire unwinding direction by a shift lever spring 5. The release lever 7 is pivotably supported adjacent the other end (a lower region in FIG. 3) of the support shaft 11, and urged in the wire winding direction by a release lever spring 7a. The shift lever 4 has a home position or wire pull starting position set to a position in which a contact portion 43 formed on the shift lever 4 contacts a setter 13 projecting from an intermediate position of the support shaft 11. The release lever 7 has a home position or release starting position set to a position in which a contact portion 7b formed on the release lever 7 contacts a setter 1a projecting from the stationary section 1.

Further, the shift lever 4 includes a feed mechanism for engaging the feed teeth 21 defined peripherally of the takeup reel 2 to transmit to the takeup reel 2 an operating force of the shift lever 4 acting in the wire winding direction. The feed mechanism includes a feed pawl 41 pivoted to the shift lever 4, and a spring 42 for urging the feed pawl 41 toward the feed teeth 21. The feed pawl 41 and feed teeth 21 have such an arrangement and shapes as to perform a one-way transmission function to transmit pivotal movement only for rotating the take up reel 2 in the winding direction. This mechanism provided between the shift lever 4 and takeup reel 2 is also referred to herein as a one-way transmission device W. The feed pawl 41 includes a projection 44 extending upward therefrom. When the shift lever 4 is in the home position, this projection 44 rides on a stationary cam 45 formed peripherally of the fixed plate 14 mounted on the support shaft 11 not to be rotatable relative thereto. In this way, the one-way transmission device W is disengageable only when the shift lever 4 is in the home position.

The relations between the release lever 7 and the above components will be described next. As shown in FIGS. 4 and 5, a first and a second cam devices C1 and C2 are provided between the release lever 7 and the first and second position retaining pawls 32 and 62. These cam devices include a first and a second cams 71 and 72 acting as drive elements and extending from proximal positions of the release lever 7 axially of the support shaft 11, and a first and a second cam followers 34 and 64 acting as driven elements and extending from upper surfaces of the first and second position retaining pawls 32 and 62 axially of the support shaft 11, respectively. With pivotal movement of the release lever 7, the second cam device C2 first pushes the second position retaining pawl 62 to a position engageable with the second position retaining teeth 61, and thereafter disengages the first position retaining pawl 32 from the first position retaining teeth 31.

The cam devices C1 and C2 are operable to engage and disengage the first and second rotation stoppers P1 and P2, and are collectively referred to as the retention canceling device R which acts on the position retaining device P. Thus, the takeup reel 2 is retained in a rotational position (a position of rotation around the support shaft 11) by the position retaining device P, and released from that rotational position by the retention canceling device R. Rotation in the wire unwinding direction (indicated by an arrow A in FIGS. 4 and 5) of the takeup reel 2 after the release is limited to a predetermined amount by a positional relationship between the first rotation stopper P1 and second rotation stopper P2 (relationship in pitch phase of the teeth). The position of the retention canceling device R shown in FIG. 4 is referred to herein as a first position, and the position thereof shown in FIG. 5 as a second position.

The way in which the change speed apparatus constructed as above operates will be described next.

As shown in FIGS. 1 and 2, the control portion 4A of the shift lever 4 is pressed in X direction with the thumb of the hand holding the grip G of the handlebar H. That is, the shift lever 4 is turned clockwise from the position shown in FIG. 4 (in X direction) to wind the wire. Then, the projection 44 of the one-way transmission device W moves below (that is, in the drawing) the stationary cam 45, and slips off the cam 45. As a result, the feed pawl 41 is turned in Z direction in FIG. 4, into engagement with the feed teeth 21. The feed pawl 41 rotates the takeup reel 2 in the winding direction (referenced B in the drawing), with the first position retaining pawl 32 disengaged from the first position retaining teeth 31, to pull the change speed wire.

A first speed is provided when the shift lever 4 is turned in the winding direction by a stroke corresponding to one pitch of the position retaining teeth 31. A second speed is provided when the shift lever 4 is turned in the same direction by a stroke corresponding to two pitches of the teeth 31. A change speed shift in this direction is referred to as a positive change speed operation. A single operation with the thumb may provide up to a third speed. For a fourth or higher speed, the shift lever 4 is returned to the home position once, and turned again in the winding direction. When a desired speed is achieved, the first position retaining pawl 32 engages the first position retaining teeth 31 (the first position retaining pawl 32 is constantly urged to the engaging position since the release lever 7 is in the position shown in FIG. 4, with the first cam 71 remaining inoperative), thereby preventing the takeup reel 2 from rotating in the unwinding direction. In this way, the state for providing a desired speed is maintained reliably. When the shift lever 4 is released thereafter, the shift lever 4 returns to the home position under the force of the shift lever spring 5 (counterclockwise in A direction in FIG. 4). The shift lever 4 stops at the home position by the contact between the contact portion 43 and setter 13, to be ready for a next operation. At this time, the projection 44 rides on the stationary cam 45 to disengage the feed pawl 41 from the feed teeth 21.

Where five to six speeds are available, the above construction allows a change to be made easily from a smaller gear to a larger gear by pushing the shift lever 4 twice in the winding direction with the thumb.

To effect negative change speed which is opposite of the foregoing change shift, i.e. to change the chain from a larger gear to a smaller gear, the control portion 7A of the release lever 7 in the home position is pressed in Y direction with the first finger of the hand holding the grip G of the handlebar H, as shown in FIGS. 1 and 2. That is, the release lever 7 is turned counterclockwise from the position shown in FIG. 4 (in Y direction), which is opposite to the direction in which the shift lever 4 is turned. As a result, the second position retaining pawl 62 is pressed toward the second position retaining teeth 61, with a tip end of the pawl 62 entering a space between adjacent teeth 61. Thereafter the first position retaining pawl 32 is disengaged from the first position retaining teeth 31 as shown in FIG. 5. At this time, the takeup reel 2 rotates counterclockwise (in A direction in FIGS. 4 and 5) by an amount corresponding to a space between the second position retaining pawl 62 and one of the second position retaining teeth 61, i.e. within one pitch of the first position retaining teeth 31. When the release lever 7 is released and allowed to pivot clockwise, the first position retaining pawl 32 moves to a position for engaging the first position retaining teeth 31, and then the second cam 72 stops pressing the second position retaining pawl 62. As a result, the second position retaining pawl 62 disengages from the second position retaining teeth 61, and the first position retaining pawl 32 engages a next one of the first position retaining teeth 31. This engagement prevents the takeup reel 2 from rotating in the wire unwinding direction under the force of the return spring 20. Thus, a change speed state is provided reliably by a smaller gear corresponding to the newly engaged one of the first position retaining teeth 31. The returning release lever 7 stops at the home position by the contact between the contact portion 7b and setter 1a, to be ready for a next operation.

The first and second control portions 4A and 7A of the levers may be movable to any positions relative to each other. As shown in two-dot-and-dash lines in FIG. 2, the first control portion 4A is close to the first finger and the second control portion 7A close to the thumb when at the respective shift ends.

Figure 6:
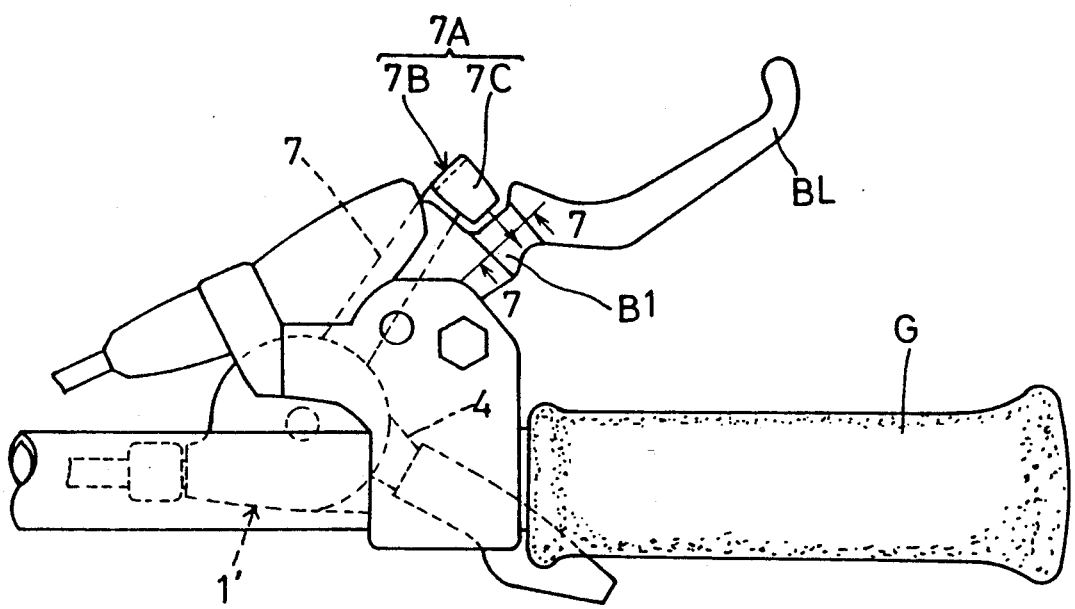
FIG. 6 is a plan view of a modified embodiment attached adjacent a grip.
Figure 7:
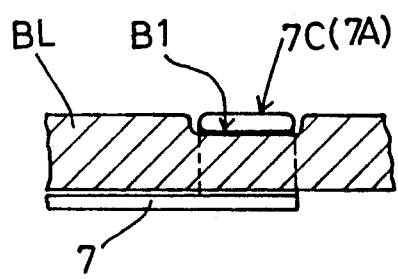
FIG. 7 is a fragmentary view in vertical section of a portion of the modified embodiment.

The foregoing embodiment may be modified in various ways as follows:

(A) As shown in FIGS. 6 and 7, the release lever 7 may have a second control portion 7A disposed adjacent a proximal end of the brake lever BL. This will expedite operation of the release lever 7 by allowing a finger to be slid from the brake lever BL to the release lever 7. The second control portion 7A in this modification extends upward from an extreme end of the release lever 7 disposed below the brake lever BL, and is bent toward the grip G. Consequently, the second control portion 7A includes, for contact by the finger, not only a surface 7B perpendicular to the pivoting directions of the release lever 7 but an upper surface 7C lying along the pivoting directions.

The second control portion 7A defines an inside surface bent in an inverted L-shape. The proximal end of the brake lever BL has an upper surface recessed as at B1, so that the proximal end fits inside the second control portion 7A when the release lever 7 is operated. Thus, the release lever 7 is operable promptly within a small stroke for the large second control portion 7A, with only a small gap between the second control portion 7A and brake lever BL to avoid a finger or foreign articles becoming caught therein. Further, the brake lever BL and the second control portion 7A have a snug fitting appearance.

The finger may be slid smoothly for a quick operation by forming the recess B1 to have such a depth that, as shown in FIG. 7, the upper surface of the brake lever BL is substantially flush with the upper surface 7C of the second control portion 7A. Further, the upper surface 7C of the second control portion 7A may include anti-slip knurls.

(B) The shift lever 4 and release lever 7 may be arranged as desired. For example, the shift lever 4 may be operable with a first finger and the release lever 7 operable with a thumb. Either lever may be operable by a finger other than the first finger.

(C) In the foregoing embodiment, the takeup reel 2 is rotatable in the unwinding direction by the force of the return spring 20. Instead, the takeup reel 2 may be arranged rotatable in the unwinding direction by a return spring included in the derailleur for acting on the change speed wire I. Thus, the return spring 20 provided between the takeup reel 2 and stationary section 1 is not absolutely necessary.

(D) The shift lever 4 and release lever 7 may be mounted on separate shafts instead of the same common shaft. The separate shafts supporting the levers 4 and 7 need not be parallel to each other.

(E) The first and second position retaining pawls 32 and 62 and the plurality of first and second position retaining teeth 31 and 61 may be reversed from the relations in the foregoing embodiment.

(F) The position retaining device P, retention canceling device R and one-way transmission device W are not limited to what are shown in the foregoing embodiment, but may be modified in various ways based on the prior art.

(G) The first and second control members need not be in the form of levers 4 and 7 as in the foregoing embodiment. The grip itself may be used as the first and second control members.

(H) The present invention is applicable for control of a rear derailleur and a front derailleur, and for control of a contained type change speed device besides the exposed type change speed device.

What is claimed is:

1. A speed control apparatus for a bicycle comprising:
    a fixed member;
    a take-up element rotatably supported on said fixed member for rotating in a wire winding direction to wind a change speed wire, said take-up element being urged in a wire unwinding direction;
    a first control member for rotating said take-up element, through a one way transmission means, in said wire winding direction by operation of said first control member in said wire winding direction, said first control member being returned to its home position after a change speed operation;
    a position retaining means switchable between a operative state for retaining said take-up element at a change speed position selected by said first control member, and an inoperative state for allowing rotation of said take-up element in said wire unwinding direction;
    a second control member for switching said position retaining means to said inoperative state by operation of said second control member in said wire unwinding direction, said second control member being returned to its home position after a change speed operation, and said position retaining means being switched to said operative state upon return of said second control member to its home position.

2. A speed control apparatus as claimed in claim 1, wherein said fixed member is positioned adjacent to a grip portion of a handle bar of said bicycle.

3. A speed control apparatus as claimed in claim 2, wherein said first control member extends such that said first control member can be operated by a finger of the hand gripping a grip of said handle bar while said second control member extends such that said second control member can be operated by another finger of said hand gripping said grip of said handle bar.

4. A speed control apparatus as claimed in claim 1, wherein said position retaining means is positioned between said fixed member and said take-up element, and is formed as teeth on said take-up element and a claw rotatably mounted on said fixed member.

5. A speed control apparatus as claimed in claim 4, wherein said position retaining means further includes a retention cancelling means which is formed as a cam surface that releases an engagement between said claw and said teeth by an operation of said second control member.

6. A speed control apparatus for a bicycle comprising:
    support means;
    a takeup reel rotatably supported on said support means for rotating in a wire winding direction to wind a change speed wire, said takeup reel being spring-loaded in a wire unwinding direction;
    position retaining means disposed between said support means and said takeup reel to be switchable between an operative state for retaining said takeup reel in stepwise rotational positions around said support means, and an inoperative state for allowing free rotation of said takeup reel, said position retaining means being spring-loaded to said operative state;
    retention canceling means for acting on said position retaining means, said retention canceling means being switchable between a first position for maintaining said position retaining means in said operative state, and a second position for switching said position retaining means to said inoperative state;
    a first control member including a first control portion and operatively connected to said takeup reel through one-way transmission means for rotating said takeup reel in the wire winding direction, said first control member being returned to a home position after a change speed operation; and
    a second control member including a second control portion for operating said retention canceling means to said second position, said second control member being returned to a home position to place said retention canceling means in said first position;
    wherein said second control member is pivotable in said wire unwinding direction to move said retention canceling means from said first position to said second position, said first control portion and said second control portion being movable close to each other circumferentially of said support means.

7. A speed control apparatus as claimed in claim 6, wherein said position retaining means includes first rotation stopper means for preventing rotation in said wire unwinding direction of said takeup reel, and allowing rotation in said wire winding direction thereof, said first rotation stopper means including:
    a first engaging portion formed on said takeup reel, and
    a first engaging element supported by said support means to be switchable between an operative position for engaging said first engaging portion, and an inoperative position separated from said first engaging portion, said first engaging element being spring-loaded to said operative position,
    said retention canceling means including first cam means for moving said first engaging element from said operative position to said inoperative position.

8. A speed control apparatus as claimed in claim 7, wherein said position retaining means further includes second rotation stopper means for preventing rotation in said wire winding direction of said takeup reel, said second rotation stopper means including:
    a second engaging portion formed on said takeup reel, and
    a second engaging element supported by said support means to be switchable between an operative position for engaging said second engaging portion, and an inoperative position separated from said second engaging portion, said second engaging element being spring-loaded to said inoperative position, said retention canceling means further including second cam means for moving said second engaging element from said inoperative position to said operative position.

9. A speed control apparatus as claimed in claim 8, wherein said first rotation stopper means and said second rotation stopper means are separated from each other approximately 180 degrees circumferentially of said support means.

10. A speed control apparatus for controlling a change speed device of a bicycle through a change speed wire, comprising:

support means;

a first control member pivotably supported on said support means;

a takeup reel connected to said change speed wire and supported on said support means to be rotatable in a wire winding direction to wind said change speed wire and in a wire unwinding direction to unwind said change speed wire, said takeup reel being spring-loaded in the wire unwinding direction;

one-way transmission means for transmitting pivotal movement of said first control member only for rotating said takeup reel in said wire winding direction;

first position retaining teeth and second positon retaining teeth rotatable with said takeup reel;

a first position retaining pawl pivotably supported by said support means for engaging said first position retaining teeth, said first position retaining pawl and said position retaining teeth are shaped to perform a one-way transmission function to allow free rotation in said wire winding direction of said first position retaining teeth;

a second position retaining pawl pivotably supported by said support means for engaging said second position retaining teeth;

a second control member pivotably supported on said support means and including a first cam and a second cam;

a first cam follower attached to said first position retaining pawl for engaging said first cam, said first cam follower being operable through said first cam to disengage said first position retaining pawl from said first position retaining teeth with pivotal movement in said wire unwinding direction of said second control member; and a second cam follower attached to said second position retaining pawl for engaging said second cam, said second cam follower being operable through said second cam to disengage said second position retaining pawl from said second position retaining teeth with pivotal movement in said wire unwinding direction of said second control member;

said second control member being movable close to said first control member when pivoting in said wire winding direction.

* * * * *